Dec. 3, 1929.  W. C. STEVENS  1,738,504
APPARATUS FOR USE IN REMOVING PRESSURE BAGS FROM PNEUMATIC TIRE CASINGS
Filed Sept. 12, 1925
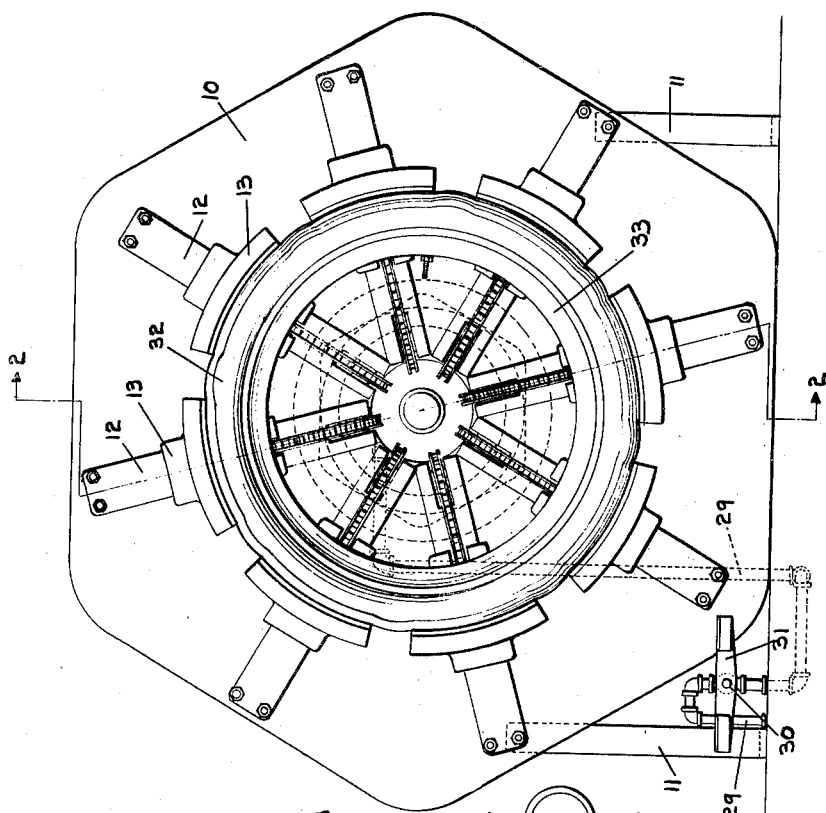
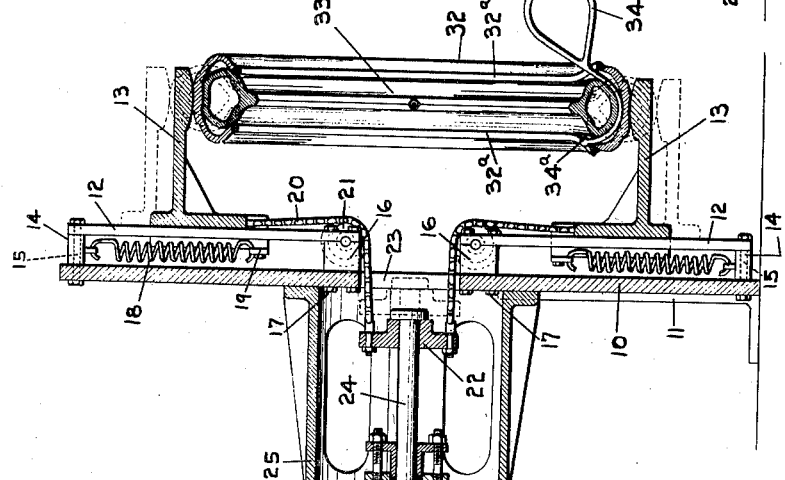
INVENTOR.
WILLIAM C. STEVENS.
BY
ATTORNEY.

Patented Dec. 3, 1929

1,738,504

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

APPARATUS FOR USE IN REMOVING PRESSURE BAGS FROM PNEUMATIC-TIRE CASINGS

Application filed September 12, 1925. Serial No. 55,924.

This invention relates to a method of and apparatus for use in removing pressure bags from pneumatic tire casings after the vulcanization of said casings.

In the art of manufacturing cord tires, the tire is first built of raw rubberized cords and raw rubber into substantially tire shape. A pressure bag is then inserted therein and the tire with the enclosed bag is mounted in a mold in which the tire is subjected to vulcanizing heat and simultaneously a pressure medium is introduced into the bag, expanding the same in such a manner as to stretch the cords in the tire and force the tire against the walls of the mold, whereby the rubberized cords will be cured under tension and the surface of the tread and sides of the tire will be molded to the desired shape.

The present invention has for its purpose the provision of a procedure, and means for carrying out said procedure, whereby the removal of the pressure bags from the tires after their vulcanization may be quickly and effectively accomplished.

A particular object of the invention is to provide means for collapsing the tire and bag by pressure directed centrally of the tire against the tread.

The foregoing and other objects are obtained by the construction illustrated in the accompanying drawings and briefly described below. It is to be understood that the invention is not limited to the specific form thereof shown and described.

Of the accompanying drawings:

Figure 1 is a front elevation of a device embodying and adapted to carry out the invention; and Figure 2 is a section on line 2—2 of Figure 1, and illustrating an air bag removing tool embodying the invention.

Referring to the drawings, 10 represents a supporting plate held in a vertical position by brackets 11, 11 and having arranged thereon in radial relation, any suitable number of, guides 12, 12 on which are slidably mounted presser elements 13, 13. Guides 12 are supported in spaced relation from plate 10 by means of spacers 14, 14 through which extend bolts 15, 15 at the outer ends of the guides, and by means of bearing blocks 16, 16 and bolts 17, 17 at the inner ends of the guides. Presser elements 13 are each normally urged outwardly by a spring 18 connected to a spacer 14 and to each slide 13 as at 19.

For simultaneously urging pressers 13 inwardly against the action of springs 18, each presser has a chain 20 connected thereto, trained over a sprocket 21 journaled in bearing blocks 16, and connected to a reciprocable cross-head 22 through an aperture 23 formed in the center of plate 10.

Reciprocation of cross-head 22 may be effected by any suitable means, a connecting rod 24 being here shown slidably mounted on a bracket 25 secured on the back of plate 10 and operable by a piston 26 in a cylinder 27 secured to bracket 25 and supported by a floor bracket 28.

Fluid pressure may be supplied to or released from the right side of piston 26 in cylinder 27 at will by means of a pipe 29 connected to cylinder 27 and to a source of supply (not shown) and having a control valve 30 therein of any suitable type operable by a double pedal lever 31. Suitable means (not shown) may be employed to regulate the pressure of fluid from the source to vary the degree of movement of pressers 13 against the resistance of the tires and bags operated upon, in accordance with the size of the bag, it being understood that the pressures employed will be sufficient to impart the desired collapsed position to the tire without being so great as to harm or destroy the tire.

In the use of the above apparatus, a vulcanized tire 32 containing a pressure bag 33 is inserted between the pressers 13, valve 36 is operated to admit fluid pressure to cylinder 27 and the tire and bag are thus collapsed, as will be evident, into the condition shown in Figure 2, the beads 32ª, 32ª of the tire, being inextensible, are thus caused to spread apart. The operative is furnished with a hook-shaped tool 34, the hook of which is curved substantially to the outer contour of a collapsed air bag and which is formed with a knob 34ª on its end so that it will not cut the tire or bag. This tool is inserted between the bag 33 and the inner surface of the tire 32 by the operative in the manner shown in Figure 2 and the bag is pulled upwardly and forwardly thereby withdrawing it from the tire between the spread apart beads. Pedal 31 is now operated to release the fluid pressure on piston 26, whereupon springs 18 draw pressers 13 outwardly and the operative removes tire 32, inserting another containing an air bag 33 in its place and repeating the foregoing operations in succession on the tires as they come from the heaters.

It will appear from the foregoing that a simple but effective method and device have been provided for facilitating the removal of pressure bags from tires. It will also be apparent that modifications of the invention may be resorted to without departing from the spirit thereof or the scope of the appended claims.

What is claimed is:

1. A device for use in removing annular pressure bags from tire casings, said device including a plurality of presser elements adapted to surround and embrace a tire casing, and means for relatively moving the elements against the outer periphery of the casing to spread the beads apart about their entire extent.

2. A device for use in removing pressure bags from tire casings, comprising a circumferential series of radially movable presser elements adapted to embrace a tire casing to engage the outer periphery thereof, means normally yieldingly urging the elements outwardly, and means for yieldingly urging the elements inwardly against the action of said first means.

3. A device for use in removing pressure bags from tire casings, comprising a circumferential series of radially movable presser elements adapted to embrace a tire casing to engage the outer periphery thereof, and means for yieldingly urging said members inwardly against the resistance of a collapsing casing embraced thereby.

4. A device for use in removing pressure bags from tire casings, comprising a circumferential series of radially movable presser elements adapted to embrace a tire casing to engage the outer periphery thereof, and means for actuating said elements to partly collapse said casing.

WILLIAM C. STEVENS.